United States Patent
Spoor et al.

(10) Patent No.: US 12,299,515 B2
(45) Date of Patent: May 13, 2025

(54) RADIOFREQUENCY IDENTIFICATION TAG DEVICES

(71) Applicant: ALLFLEX UK GROUP LTD, Stanley (GB)

(72) Inventors: Ian Graydon Spoor, Stanley (GB); Keith Daniel James Heald, Stanley (GB)

(73) Assignee: ALLFLEX UK GROUP LTD, Stanley (GB)

( * ) Notice: Subject to any disclaimer, the term of this patent is extended or adjusted under 35 U.S.C. 154(b) by 4 days.

(21) Appl. No.: 18/253,215

(22) PCT Filed: Nov. 3, 2021

(86) PCT No.: PCT/EP2021/080538
§ 371 (c)(1),
(2) Date: May 17, 2023

(87) PCT Pub. No.: WO2022/106203
PCT Pub. Date: May 27, 2022

(65) Prior Publication Data
US 2023/0409864 A1 Dec. 21, 2023

(30) Foreign Application Priority Data
Nov. 17, 2020 (GB) ...................... 2018053

(51) Int. Cl.
*G06K 19/077* (2006.01)
*G06K 19/07* (2006.01)

(52) U.S. Cl.
CPC ... *G06K 19/07758* (2013.01); *G06K 19/0723* (2013.01); *G06K 19/07786* (2013.01)

(58) Field of Classification Search
CPC ......... G06K 19/07758; G06K 19/0723; G06K 19/07786; G09F 3/037
See application file for complete search history.

(56) References Cited

U.S. PATENT DOCUMENTS

| | | | |
|---|---|---|---|
| 4,498,507 A * | 2/1985 | Thompson | B65D 63/1036 140/93.2 |
| 2007/0188306 A1* | 8/2007 | Tethrake | G06K 1/18 340/572.1 |
| 2011/0009508 A1 | 4/2011 | Kolton et al. | |

(Continued)

FOREIGN PATENT DOCUMENTS

| | | |
|---|---|---|
| CN | 106628598 A | 5/2017 |
| CN | 208538407 U | 2/2019 |

(Continued)

*Primary Examiner* — Laura A Gudorf
(74) *Attorney, Agent, or Firm* — S.J. Intellectual Property LTD.

(57) ABSTRACT

A combined RFID tag and label device for attaching an elongate object such as a cable, cable bundle, or pipe. The device comprises a plastic flag having a display surface to carry a visible identification code or label for the device and includes an encapsulated RFID tag configured to provide remote-readable RFID data to an RFID reader. The device includes a device tie and a tie mount which are configured such that, after fastening, the flag has a central longitudinal axis which lies above, and is aligned parallel to, a longitudinal axis of the elongate object where the device is fastened.

23 Claims, 3 Drawing Sheets

(56) References Cited

U.S. PATENT DOCUMENTS

| | | | |
|---|---|---|---|
| 2012/0026453 A1 | 2/2012 | Norman et al. | |
| 2016/0148086 A1* | 5/2016 | Clarke | G06K 19/027 235/492 |
| 2018/0229906 A1* | 8/2018 | Bednarowski | B32B 3/04 |
| 2021/0295128 A1* | 9/2021 | Jelken | G06K 19/07758 |
| 2022/0132800 A1* | 5/2022 | Rödding | G06K 19/041 340/573.3 |

FOREIGN PATENT DOCUMENTS

| | | |
|---|---|---|
| CN | 209388349 U | 9/2019 |
| CN | 211309487 U | 8/2020 |
| FR | 2991406 A1 | 12/2013 |
| KR | 20080110032 A | 12/2008 |
| KR | 20110080409 A | 1/2010 |
| KR | 20180035537 A | 4/2018 |

\* cited by examiner

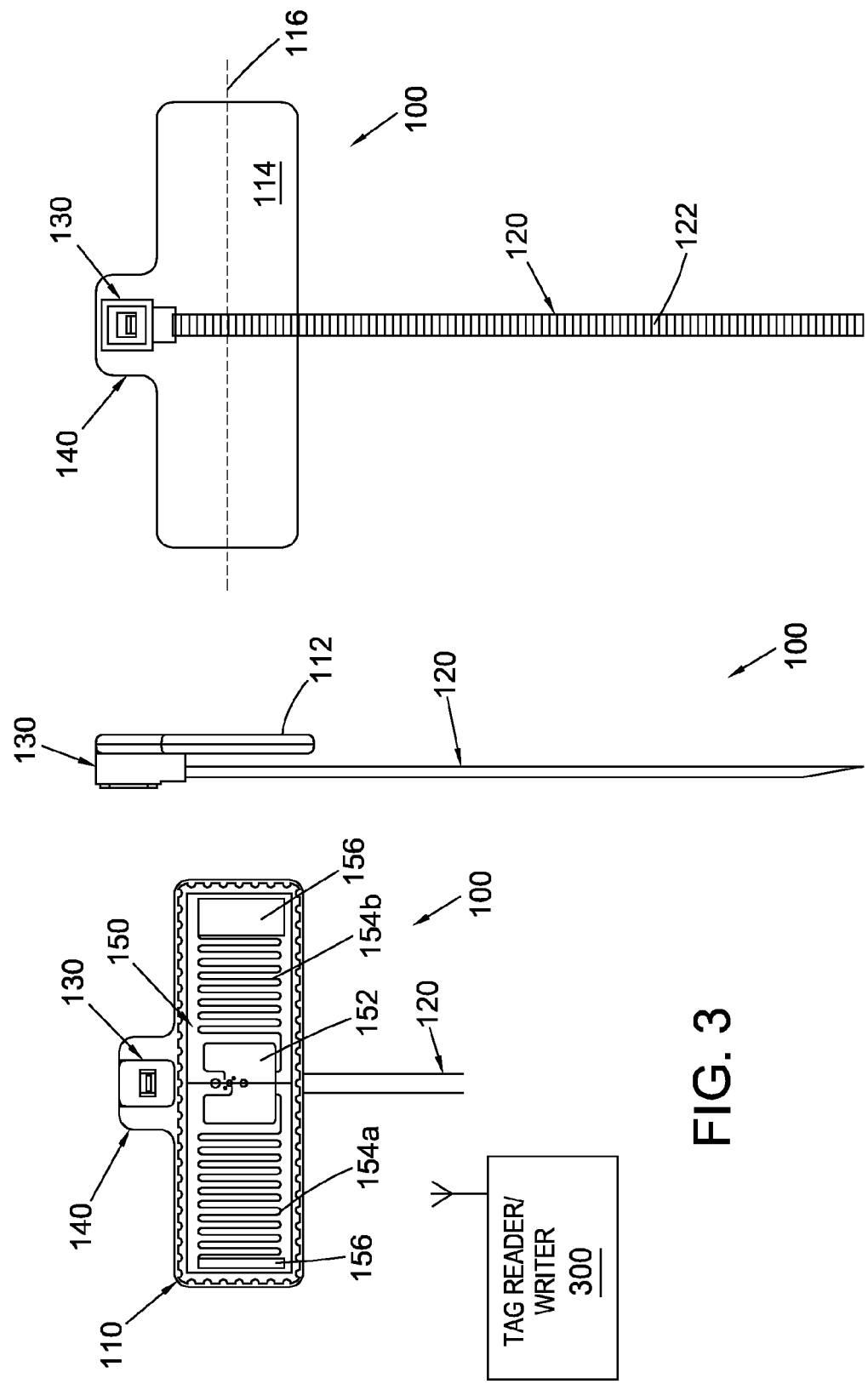

RADIOFREQUENCY IDENTIFICATION TAG DEVICES

FIELD

This specification relates to radiofrequency identification (RFID) tag devices.

BACKGROUND

It is known to label a bundle of cables with a flag attached to the bundle by a tie. An example of such a device is described in KR2018/0035537A. However such an approach is sub-optimal, for example in an environment where there is a high density of cables such as the wiring loom of a car. Further background prior art can be found in US2011/0095089; US2012/0026453; FR2991406A; KR1020080110032A; CN209388349U; and KR1020110080409A.

SUMMARY

In one aspect there is therefore described a combined RFID tag and label device.

The device can be used for attaching to a cable (which as used here includes wiring), cable bundle, or to one or more pipes, in particular metal pipes. However in general the device may be attached to any elongate object.

The device may comprise a plastic display part, referred to herein as a flag, having a display surface to carry a visible identification code or label for the device and a reverse surface opposite the display surface. The flag may be in the shape of an oblong. The flag includes an RFID tag configured to provide remote-readable RFID data to an RFID reader. In some implementations the RFID tag is encapsulated in the flag.

The device may also comprise a device tie to fasten around the elongate object, to attach the device to the elongate object. The device tie may comprising a length of tape or ribbon.

The device may also comprise a tie mount on the flag. The tie mount may be located on the reverse surface of the flag, and may provide a tie mount attachment for a first end of the tie. In certain implementations the tie extends from the tie mount across and generally parallel to the reverse surface of the flag.

In some implementations the tie mount has an aperture to receive a second, opposite end of the tie after the tie has been passed around the elongate object. The flag may have a corresponding aperture so that the second end of the tie can extend through the flag during fastening (although it may afterwards but cut flush to the device).

In some implementations the device is configured such that, after fastening, the plastic flag has a central longitudinal axis which lies above, in implementations substantially directly above, and is aligned parallel to, a local longitudinal axis of the elongate object, i.e., where the device is fastened.

The central longitudinal axis may be defined by or may be a long axis of the flag looking towards the display surface, i.e. it may run across the middle of the flag parallel to the long axis.

The flag need not be oblong. For example it may be round or square (in which case it may lack a central longitudinal axis aligned parallel to the elongate object).

Some advantages of these and other features of the combined RFID tag and label device follow.

It can be difficult to see to what object, e.g. to what bundle of cables, a hanging flag is attached. By contrast with a hanging flag, implementations of the present combined RFID tag and label device fasten along a cable bundle and so are closely physically associated with the cable bundle. Embedding an RFID tag in the device allows additional data to be stored in and/or retrieved from the tag, and hence associated with the cable. However in an environment where there is a high density of cables it may not be easy to bring a tag reader close to a particular device to read the RFID tag. By combining an encapsulated RFID tag with a display surface i.e. flag which is closely physically associated with a particular cable bundle and bears visible identification code or physical label for the device, a link can be made between a particular cable bundle and the information retrieved from the RFID tag. In addition, because the flag is closely physically associated with the object to which it is attached it is less likely to move during reading or writing—movement can affect the reliability of the reading or writing process.

Implementations of the device provide an arrangement which combines a label which is clearly associated with a particular cable bundle with an RFID tag which can provide further information relating to the cable bundle and/or to an item connected to the cable bundle. The label may be a physical label stuck to the display surface or it may comprise markings on the display surface e.g. made by direct laser writing.

Similar difficulties to those described above can arise with pipes, for example utility pipes where pipes for multiple dwellings may be co-located. Implementations of the device can provide similar advantages when used with other elongate objects.

One problem which can arise when locating an RFID tag close to an elongate object which includes metal, such as a bundle of cables or a metal pipe, is a reduction in signal received by/sent from the tag and/or detuning of the tag. Therefore in some implementations the device is configured such that, after fastening, the flag lies adjacent to but (slightly) proud, i.e. raised, from the elongate object. This can be achieved by arranging the tie mount attachment so that the first end of the tie is displaced (slightly) away from the reverse surface of the flag. Hence the part of the tie that extends from the tie mount across and generally parallel to the reverse surface may also be displaced (slightly) away from the reverse surface of the flag.

In some implementations the tie mount may be located to facilitate the central longitudinal axis of the flag being aligned to lie directly above and parallel to the longitudinal axis of the elongate object. In particular embodiments the tie mount may be located beyond (but adjacent) a longitudinal edge of the flag e.g. on a tab extending from the longitudinal edge, such that when fastened the central longitudinal axis lies above, in some implementations substantially directly, above the longitudinal axis of the elongate object.

In some implementations the RFID tag is a UHF (Ultra High Frequency) tag comprising an integrated circuit coupled to a dipole antenna e.g. a meandered dipole antenna. One element of the pair forming the dipole extends physically to each side of the integrated circuit in a direction along the central longitudinal axis, e.g. to occupy the oblong shaped flag. Each dipole element may have a respective radiator at its distal end.

In some implementations there is a single tie mount located in a longitudinally central position along the central longitudinal axis. Where the RFID tag comprises an integrated circuit in the middle with the dipole antenna extending to either side, providing a single central mounting position helps to physically balance the ends of the dipoles so that they each sit at roughly the same distance from the surface of the elongate object, which can result in more reliable tag reading/writing.

In some implementations the device is integrated with a cable tie. Thus in implementations the tie has teeth and the aperture of the tie mount has a pawl to engage with the teeth to fasten the tie within the tie mount.

In some implementations a piece which will become the rear surface of the flag and the tie mount are moulded, e.g. compression moulded, around the device tie. This facilitates economical manufacture.

There is also described a system comprising the combined RFID tag and label device and a tag reader to read RFID data from the tag. The tag reader may include a subsystem, e.g. a user interface, to input an identifier visually read from the identification code or label. The identifier may be read by a human user or by other means, including visual recognition using a computer. The tag reader may be configured to provide tag data read from the RFID tag identified by the identifier, e.g. by displaying the data and/or outputting the data via a wired or wireless network. In a similar way a tag writer for the tag may be configured to write tag data into an RFID tag identified by the identifier. The tag reader and tag writer may comprise a combined tag reader/writer. This can facilitate reading data relating to a particular cable/cable bundle/pipe when many are present e.g. in a vehicle wiring loom or when the device labels a utility pipe such as a gas or water pipe, or pipe of an industrial plant or facility. The data relating to a particular cable/cable bundle/pipe may comprise data relating to a device or an item of equipment to which the cable/cable bundle/pipe is connected.

In some implementations of the system the RFID tag reader and/or writer is combined with a bar code reader to read a bar code on the flag, to thereby provide a combined interrogator for the device. In use the combined interrogator may be used to read the bar code to identify the device and then write data e.g. input by a user, into the identified device.

In one application a vehicle e.g. car wiring loom may be equipped with examples of the combined RFID tag and label device. Thus the wiring loom may comprise multiple cable bundles, and devices as described above may be fastened to at least some of these bundles.

In another aspect there is described an RFID tag device fastenable with a cable tie. The RFID tag device may comprise a first e.g. display surface, and a second surface disposed to a rear of the first surface, and a cable tie mount, arranged to receive a cable tie, and disposed on a mounting area of the RFID tag device. The mounting area is on a surface other than the first surface. When the RFID tag device is in a fastened configuration around an object e.g. an elongate object such as a cable, cable bundle or pipe(s), to which the RFID tag device is attached, a long axis of the RFID tag device lies substantially parallel to a longitudinal axis of the object and the first surface faces away from the object.

In some implementations the fastened configuration is defined by attachment of the RFID tag to the elongate object by a cable tie received in the cable tie mount. The first and second surface may be quadrilaterals, e.g. substantially rectangles, and the mounting area may within or outside of a quadrilateral area defined by the first/second surface.

In some implementations the second surface has substantially the same extent as the first surface and the mounting area is co-planar with the second (rear) surface and extends laterally away from an area defined by the second surface, e.g. on a tab, such that, in the fastened configuration, the second face lies substantially facing the object. For example the mounting area may define a T-shaped standoff or tab allowing the tag to sit substantially in front of, as well as in line with, the object, e.g. the cable/bundle.

The RFID tag device may have an RFID tag, e.g. a UHF RFID tag, located between the first surface and the second surface. The cable tie mount may be configured to hold the UHF RFID tag away from the cable tie i.e. slight proud (raised) from a surface of the elongate object.

In some implementations the slot extends through the first and second surface and is arranged to receive a surplus length of a cable tie when said cable tie is received in the cable tie mount and the RFID tag device is in the fastened configuration. This facilitates mounting the RFID tag adjacent to and parallel to the elongate object e.g. cable.

The cable tie mount may be oriented such that a cable tie is receivable in the cable tie mount along an axis that is substantially perpendicular to the long axis of the RFID tag device. The axis may also be substantially parallel with a plane defined by the RFID tag. There may be just a single cable tie mount.

In some implementations the RFID tag device is an ultra-high frequency (UHF) RFID tag. The RFID device comprises an RFID tag which may include an RF-readable chip configured to be remotely programmed by an RF programming device.

In implementations the first surface is laser-printed or bears a laser-printed information label.

The RFID tag device may be formed from plastic (apart from the RFID tag), e.g. by a compression moulding between the mounting area of the RFID tag device and the cable tie mount.

Some advantages of the combined RFID tag and label devices described herein are as follows.

In implementations the combined RFID tag and label device (cable tie and RFID tag) can be fastened around a cable bundle of a vehicle wiring loom in a single tying action, and in a way that results in the flag sitting proud of the cables once fastened. Some other approaches require the cable tie to be inserted separately into the RFID tag and then fastened, which requires two actions rather than a single action. This can be important e.g. in the automotive industry. Further, the cable tie and RFID tag can be fastened in a way that avoids bending of the electronic components in the tag inlay during fastening. Also, displacing the RFID tag away from the cable bundle reduces the influence of the metal in the cable (or pipe) which can alter the direction or reduce the magnitude of an RFID signal from the tag. For similar reasons the tag can also be arranged to have a predetermined orientation with respect to the cable bundle after fastening.

DRAWINGS

These and other aspects of the device will now be further described, by way of example only, with reference to the accompanying figures, in which:

FIG. 3 is a front view of the device of FIG. 1 showing an RFID tag inside the device.

FIG. 4 is a side view of the device of FIG. 1 with the device tie unfastened.

FIG. 5 is a rear view of the device of FIG. 1.

In the figures like elements are indicated by like reference numerals.

DESCRIPTION

Figure 1:
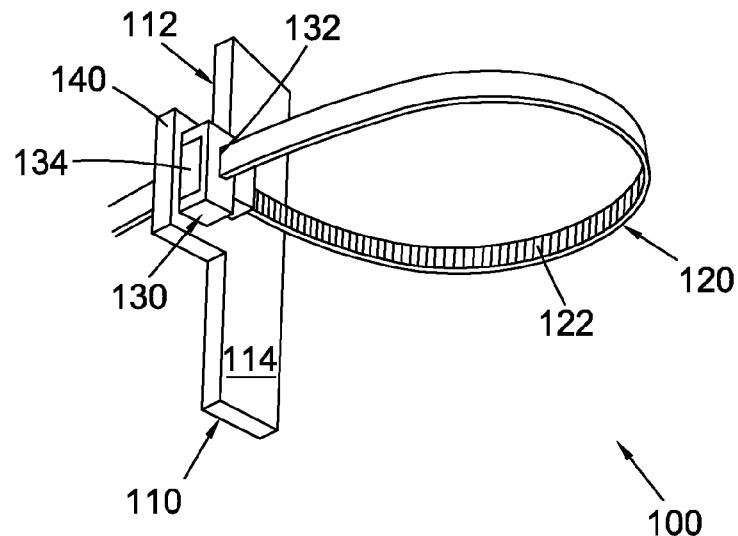
FIG. 1 is a perspective view of an example combined RFID tag and label device.
Figure 2:
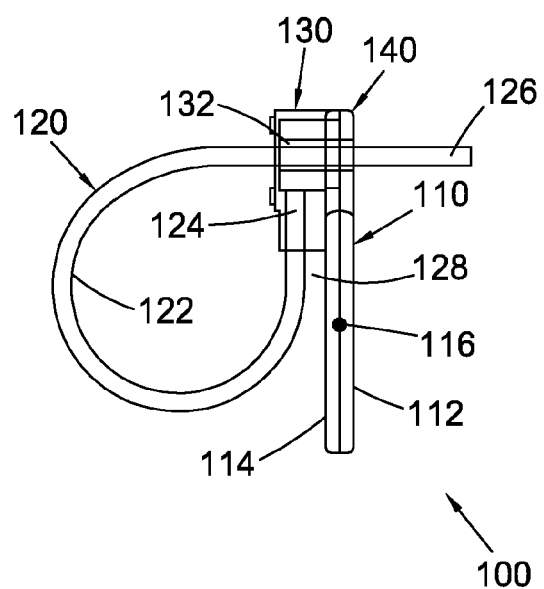
FIG. 2 is a side view of the device of FIG. 1 with the device tie fastened.

FIGS. 1 and 2 show a combined RFID tag and label device 100. The device 35 comprises a plastic display part, which may be referred to as a flag 110. The flag 110 may have an oblong, e.g. substantially rectangular shape. The flag 110 has a display surface 112 (occluded in FIG. 1) and a reverse surface 114. The display surface may have an identifier such as a bar code or QR code or may have a label bearing an identifier attached to it. In some embodiments the identifier may be laser printed on the display surface.

The device has a device tie 120, e.g. comprising a length of tape or ribbon, serrated on one face 122 for attaching the device to an elongate object such as a cable (which as used here includes wiring), cable bundle, or to one or more pipes, e.g. metal pipes. The elongate object may be electrically conducting e.g. it may be made of or include some metal.

A first end 124 of the tie is attached to a tie mount 130 so that the tie extends from the tie mount 130 across and generally parallel to the reverse surface 114. In implementations there is a gap 128 between the tie 120 and the reverse surface 114 of the flag.

The tie mount 130 has an aperture 132 to receive a second end 126 of the tie, which may be tapered. There is a corresponding aperture 116 in the flag to allow the tie to extend through the flag as shown in FIG. 2. The tie mount 130 has an internal pawl 134 (not shown in FIG. 2) to engage with teeth of the serrated face 122 of the tie to fasten the device.

The tie mount is located on a tab 140 extending from an edge of the flag 110 so that, when fastened, a central longitudinal axis 116 of the flag lies substantially directly above the longitudinal axis of the cable, cable bundle, or pipe(s). In implementations there is only a single tie mount, as shown.

FIG. 3 shows an internal configuration of the device 100. An RFID tag 150 is encapsulated or embedded in the flag 110 e.g. within a chamber within the flag.

The RFID tag comprises an integrated circuit 152 coupled to a dipole antenna 154 comprising a pair of dipole elements 154*a,b* extending to either side of the integrated circuit 152. The dipole elements 154*a,b* may be meandering dipole elements as shown; each may optionally have a radiator 156 at the end. The integrated circuit 152 is located at a longitudinally central position, aligned with the tie mount 130. The RFID tag may be a UHF tag e.g. with a range of 1-10 m; it may be active or passive.

A tag reader/writer 300 may wirelessly communicate with the RFID tag 150 to read data from or write data to the tag.

FIGS. 4 and 5 other views of the device 100, and illustrate the central longitudinal axis 116 of the flag.

Figure 6:
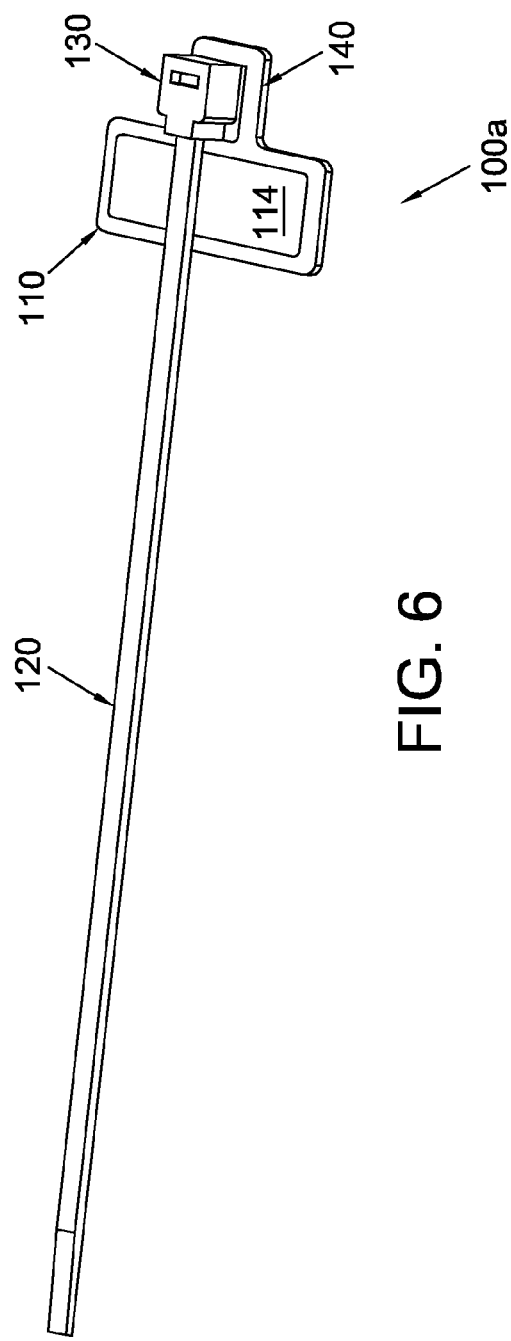
FIG. 6 is a perspective view of another example combined RFID tag and label device.

FIG. 6 shows a perspective view of another example device 100*a*. In this device the tab 140 extends further beyond a longitudinal edge of the flag, displacing the flag slightly away from an axis of the cable bundle or other object to which it is attached.

In implementations the device 100, 100*a* is made from plastic i.e. an electrically non-conducting organic polymer. The device may be fabricated by compression moulding a first device part comprising the tie mount and the reverse surface of the flag; compression moulding a second device part comprising the display surface; and then joining the two device parts to encapsulate the RFID tag. Manufacture may be facilitated by compression moulding the first device part over/around the device tie. The pawl may also be included at this stage.

The combined RFID tag and label device may be used to label cable bundles of a vehicle wiring loom. In such an environment it is particularly difficult to ensure that a correct tag is written to/read from because of the large number of cables. Embodiments of the device provide significant advantages in such an environment.

Another use case is preventative maintenance. In one example the flag is provided with a machine readable code such as a 10 or 2D bar code (e.g. QR code) and interrogated with a combined interrogator comprising a combined RFID tag reader/writer and bar code reader. Conveniently for a user the bar code may be arranged to be read side-on i.e. when a (long) axis of the bar code is aligned with the elongate object, such as a cable or pipe, to which the device is attached. The bar code is used to identify the object, e.g. cable or pipe, to the combined interrogator which may then be used to write data to the RFID tag in the flag, such as a date of when the object, e.g. pipe or cable, was checked.

Many alternatives will occur to the skilled person. For example, in principle the described device may be attached to objects which are not elongate, such as boxes, packages, containers and the like.

Different features and aspects of the device described herein may be combined in a single implementation. Conversely, features described in combination may be implemented separately or in a sub-combination.

The invention is not limited to the described embodiments and encompasses modifications apparent to those skilled in the art lying within the scope of the claims appended hereto.

The invention claimed is:

1. A combined radio-frequency identification (RFID) tag and label device for attaching around an elongate object wherein the elongate object comprises a cable, cable bundle, or one or more pipes, the device comprising:
   a plastic flag having a display surface to carry a visible identification code or label for the device and a reverse surface opposite the display surface,
   wherein the flag includes an encapsulated RFID tag configured to provide remote-readable RFID data to an RFID reader;
   a device tie to fasten around the elongate object to attach the device;
   a tie mount on the flag wherein the tie mount is located on the reverse surface of the flag and provides a tie mount attachment for a first end of the tie such that the tie extends from the tie mount across and generally parallel to the reverse surface,
   wherein the tie mount has an aperture to receive a second, opposite end of the tie after the tie has been passed around the elongate object, and wherein the flag has a corresponding aperture so that the second end of the tie can extend through the flag during fastening; and
   configured such that, after fastening, the display surface faces away from the elongate object.

2. The device of claim 1 wherein the tie mount attachment for the first end of the tie is configured such that the first end of the tie, and the part of the tie the extends from the tie mount across and generally parallel to the reverse surface, is displaced away from the reverse surface of the flag such that, after fastening, the flag lies adjacent to but slightly proud from the elongate object.

3. The device of claim 1 wherein the tie mount is located beyond a longitudinal edge of the flag such that, when fastened, the central longitudinal axis lies above the longitudinal axis of the elongate object.

4. The device of claim 1 wherein the flag has an oblong shape and wherein the RFID tag comprises an integrated circuit located in a longitudinally central position along the central longitudinal axis with a dipole antenna extending to each side of the integrated circuit along the central longitudinal axis, comprising a single said tie mount located adjacent the integrated circuit in a longitudinally central position along the central longitudinal axis.

5. The device of claim 1 wherein the tie has teeth and the aperture of the tie mount has a pawl to engage with the teeth to fasten the tie within the tie mount.

6. The device of claim 1 wherein the rear surface of the flag and tie mount are compression moulded around the device tie.

7. The device of claim 1, wherein the flag has a central longitudinal axis defined by a long axis of the flag when looking towards the display surface, and wherein the device is configured such that, after fastening, the central longitudinal axis of the flag lies above, and is aligned parallel to, a longitudinal axis of the elongate object where the device is fastened.

8. A vehicle wiring loom comprising multiple cable bundles, and a combined radio-frequency identification (RFID) tag and label device fastened to each of at least some of the cable bundles, the device comprising:
a plastic flag having a display surface to carry a visible identification code or label for the device and a reverse surface opposite the display surface,
wherein the flag includes an encapsulated RFID tag configured to provide remote-readable RFID data to an RFID reader;
a device tie to fasten around the elongate object to attach the device;
a tie mount on the flag wherein the tie mount is located on the reverse surface of the flag and provides a tie mount attachment for a first end of the tie such that the tie extends from the tie mount across and generally parallel to the reverse surface,
wherein the tie mount has an aperture to receive a second, opposite end of the tie after the tie has been passed around the elongate object, and wherein the flag has a corresponding aperture so that the second end of the tie can extend through the flag during fastening; and
configured such that, after fastening, the display surface faces away from the elongate object.

9. A system comprising:
at least one of a tag reader and a tag writer; and
a combined radio-frequency identification (RFID) tag and label device for attaching around an elongate object wherein the elongate object comprises a cable, cable bundle, or one or more pipes, the device comprising:
a plastic flag having a display surface to carry a visible identification code or label for the device and a reverse surface opposite the display surface,
wherein the flag includes an encapsulated RFID tag configured to provide remote-readable RFID data to an RFID reader;
a device tie to fasten around the elongate object to attach the device;
a tie mount on the flag wherein the tie mount is located on the reverse surface of the flag and provides a tie mount attachment for a first end of the tie such that the tie extends from the tie mount across and generally parallel to the reverse surface,
wherein the tie mount has an aperture to receive a second, opposite end of the tie after the tie has been passed around the elongate object, and wherein the flag has a corresponding aperture so that the second end of the tie can extend through the flag during fastening; and
configured such that, after fastening, the display surface faces away from the elongate object.

10. The system of claim 9 wherein the at least one of the tag reader and the tag writer is a tag writer; and
wherein the remote-readable RFID data is writable by the tag writer, wherein the tag writer includes a subsystem to input an identifier from the identification code or label into the tag writer, and wherein the tag writer is configured to write tag data into the RFID tag identified by the identifier.

11. The system of claim 9 wherein the at least one of the tag reader and the tag writer is a combined tag reader/writer, wherein the remote-readable RFID data is readable by the tag reader/writer, wherein the tag reader/writer includes a subsystem to input an identifier from the identification code or label into the tag reader/writer, and wherein the tag reader/writer is configured to provide tag data read from the RFID tag identified by the identifier.

12. The system of claim 9 wherein the at least one of the tag reader and the tag writer is a tag reader wherein the remote-readable RFID data is readable by the tag reader, wherein the tag reader includes a subsystem to input an identifier from the identification code or label into the tag reader, and wherein the tag reader is configured to provide tag data read from the RFID tag identified by the identifier.

13. The system of claim 9 wherein the flag has a bar code and wherein the at least one of the tag reader and the tag writer is further combined with a bar code reader to read the bar code on the flag to identify the device for writing data into the identified device.

14. An radio-frequency identification (RFID) tag device fastenable with a cable tie, the RFID tag device comprising:
a first surface, and a second surface disposed to a rear of the first surface;
a cable tie mount, arranged to receive a cable tie, and disposed on a mounting area of the RFID tag device, wherein the mounting area is on the second surface, wherein the cable tie mount provides an attachment for a first end of the cable tie such that the cable tie extends from the cable tie mount across and generally parallel to the second surface;
wherein, when the RFID tag device is in a fastened configuration around an object to which the RFID tag device is attached, a long axis of the RFID tag device lies substantially parallel to a longitudinal axis of the object and the first surface faces away from the object.

15. An RFID tag device as claimed in claim 14, wherein the mounting area is co-planar with the second surface and extends laterally away from an area defined by the second surface, such that, in the fastened configuration, the second face lies substantially facing the object.

16. An RFID tag device as claimed in claim 14 comprising an RFID tag located between the first surface and the second surface, and wherein the cable tie mount is configured to hold the RFID tag away from the cable tie.

17. An RFID tag device as claimed in claim 14, further comprising a slot extending through the first and second surface, the slot arranged to receive a surplus length of a cable tie when said cable tie is received in the cable tie mount and the RFID tag device is in the fastened configuration.

18. An RFID tag device as claimed in claim 14, wherein the cable tie mount is oriented such that a cable tie is receivable in the cable tie mount along an axis that is substantially perpendicular to the long axis of the RFID tag device.

19. An RFID tag device as claimed in claim 14, wherein the RFID tag device is an ultra-high frequency (UHF) RFID tag.

20. An RFID tag device as claimed in claim 14, wherein the first surface is laser-printed or bears a laser-printed information label.

21. An RFID tag device as claimed in claim 14, wherein the RFID tag device is plastic apart from the RFID tag, and formed by a compression moulding between the mounting area of the RFID tag device and the cable tie mount.

22. An RFID tag device as claimed in claim 14 comprising an RFID tag which includes an RF-readable chip configured to be remotely programmed by an RF programming device.

23. An RFID tag device as claimed in claim 14, wherein the RFID tag device comprises a single said cable tie mount.

\* \* \* \* \*